(12) United States Patent
Bailey et al.

(10) Patent No.: US 7,212,920 B1
(45) Date of Patent: May 1, 2007

(54) SPEED DEPENDENT VARIABLE RANGE DISPLAY SYSTEM

(75) Inventors: Gary C. Bailey, Beaverton, OR (US); Kenneth A. Zimmerman, Portland, OR (US); Louis J. Bailey, Sherwood, OR (US); John G. Wilson, West Linn, OR (US); Robert A. Armstrong, Camby, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 10 days.

(21) Appl. No.: 10/953,776

(22) Filed: Sep. 29, 2004

(51) Int. Cl.
*G01C 21/30* (2006.01)
*G01C 21/00* (2006.01)

(52) U.S. Cl. .......................... 701/211; 340/961; 342/33
(58) Field of Classification Search ................ 701/211, 701/3, 9, 6, 10, 14; 340/961, 963, 945, 973, 340/971, 949, 968, 980; 342/33, 34, 29, 342/64, 63, 65, 58
See application file for complete search history.

(56) References Cited

U.S. PATENT DOCUMENTS

| | | | | |
|---|---|---|---|---|
| 5,111,400 A | * | 5/1992 | Yoder | 701/3 |
| 6,076,042 A | * | 6/2000 | Tognazzini | 701/301 |
| 6,496,760 B1 | * | 12/2002 | Michaelson et al. | 701/3 |
| 6,507,783 B2 | * | 1/2003 | Katayama et al. | 701/208 |
| 6,553,307 B2 | | 4/2003 | Stratton | |
| 6,571,166 B1 | | 5/2003 | Johnson | |
| 6,606,563 B2 | | 8/2003 | Corcoran | |
| 6,629,035 B2 | * | 9/2003 | Seto et al. | 701/208 |
| 6,720,891 B2 | * | 4/2004 | Chen et al. | 340/969 |
| 6,744,396 B2 | * | 6/2004 | Stone et al. | 342/36 |
| 6,756,887 B2 | * | 6/2004 | Evans | 340/436 |
| 6,862,501 B2 | * | 3/2005 | He | 701/3 |
| 6,917,860 B1 | * | 7/2005 | Robinson et al. | 701/3 |

* cited by examiner

*Primary Examiner*—Dalena Tran
(74) *Attorney, Agent, or Firm*—Nathan D. Jensen; Kyle Eppele

(57) ABSTRACT

The speed dependent variable display system for a computer-implemented moving-map vehicle display system includes a data conversion module for converting a vehicle speed input signal to a distance range value; and, an application module for utilizing the distance range value, vehicle position information, vehicle direction of movement information, and input geographical information to provide scaled output geographical information. The scaled output geographical information is utilized to provide a situational awareness display which is optimized in accordance with the vehicle's position, direction of movement and speed. A display apparatus receives the scaled output geographical information to provide an optimized situational awareness display for a moving-map vehicle display system.

20 Claims, 5 Drawing Sheets

SPEED DEPENDENT VARIABLE RANGE DISPLAY SYSTEM

BACKGROUND OF THE INVENTION

1. Field of the Invention

The present invention relates to vehicle situational awareness display systems, and more particularly to a vehicle range display system that depicts a vehicle's position in relation to actual or virtual ground features in a speed dependent variable manner.

2. Description of the Related Art

Moving-map display systems have been used to enhance the situational awareness of the operators of ground vehicles and to assist in the movement of these vehicles along a desired route. The desired route may be specifically indicated or a general map may be provided from which the operator can distinguish the desired route. The presentation of the vehicle's position is provided on a display device and typically consists of a symbol representing the aircraft positioned on the display in relation to symbols representing the ground features surrounding the vehicle's position. The features represented may include the physical boundaries of roadways or pathways defined by paved areas, buildings or other permanent structures, natural features such as vegetation and bodies of water, signs, and markings such as roadway center stripes.

Moving-map display systems have been used to improve situational awareness including applications in ground, marine, and air navigation. A database of the desired features to be represented on the display device needs to be transmitted to the moving-map display system or be entirely encoded within the system itself. The representation of each of these features (designated in total as the "map") is positioned relative to the symbol representing the vehicle. The designation of the system as a moving-map display system implies that when the vehicle is in motion, the vehicle symbol remains fixed on the display while the map moves so the vehicle symbol remains correctly positioned on the portion of the map (and its features) being displayed. The vehicle symbol can be fixed at the center of the display or may be biased downward if more of a forward view from the vehicle is desired.

In order to determine the relationship of the vehicle symbol to the map representation, a precise position of the vehicle in relation to a reference point on the map must be known. This also assumes that the precise position of each feature of the map is also established in relation to that reference point. Therefore, the moving-map display system interfaces with or incorporates a precise position location system, which may be a satellite based system such as the Global Positioning System or a terrestrial based system such as LORAN, that in conjunction with widely available computer processing capability can readily provide location with respect to the earth's surface.

The extent of the map presented on the display device is dependent on the scaling or range established for the total display area allotted to the moving-map representation. The moving-map display range is set as appropriate for the application which the moving-map display system supports. Typically, the moving-map display system includes a "zoom" feature which allows the range of the presented map to be reduced (zoom-in) or expanded (zoom-out) in discrete steps through manual selection by the operator.

While a manual selection of discrete moving-map zoom settings may be adequate for certain vehicle movement applications, larger vehicle movement applications, such as the taxiing of large aircraft, rely on sufficient anticipation of required changes in vehicle movement (e.g., upcoming stop positions, turns) as well as the ability to determine how well a particular maneuver is being accomplished (e.g., closeness to required stop position, closeness to turn center). Specific moving-map zoom settings may not be adequate to support all of these maneuvering tasks. However, certain vehicle maneuvers (e.g., stopping and turning) may require full attention of the vehicle operator(s) and, therefore, may not allow an opportunity to manually alter and optimize the moving-map display zoom setting.

U.S. Pat. No. 6,571,166, issued to W. A. Johnson et al discloses a head up display system that incorporates conformal and non-conformal views and associated symbology to provide highly informative and intuitive guidance with respect to all aspects of operating an aircraft or other vehicle in a controlled geographical area, by utilizing calculated views from the pilot seat, aircraft speed, and relevant ground operation information. The non-conformal view incorporated in that invention is related to a moving-map display type feature in that it provides route information which cannot be directly viewed within the real world features as seen through the head up display. However, that invention's display of geographical information is limited by the maintaining of a relatively consistent presentation between the non-conformal and conformal views. While this allows adequate close range awareness at slow aircraft ground speeds, it is deficient in providing longer range awareness of upcoming turns and stop points.

SUMMARY OF THE INVENTION

In a broad aspect, the present invention is a speed dependent variable display system for a computer-implemented moving-map vehicle display system. The speed dependent variable display system includes a data conversion module for converting a vehicle speed input signal to a distance range value; and, an application module for utilizing the distance range value, vehicle position information, vehicle direction of movement information, and input geographical information to provide scaled output geographical information. The scaled output geographical information is utilized to provide a situational awareness display which is optimized in accordance with the vehicle's position, direction of movement and speed. A display apparatus receives the scaled output geographical information to provide an optimized situational awareness display for a moving-map vehicle display system.

The data conversion module preferably converts the vehicle speed input signal to a distance range value that varies dynamically, based on an optimized function utilizing the vehicle speed input signal.

The data conversion performed also limits the distance range value to a minimum range value based on a minimum vehicle speed, or a maximum range value based on a maximum vehicle speed. For vehicle speeds between these minimum and maximum speed limits, the distance range value varies dynamically between a minimum and maximum distance range.

The dynamic variation of the distance range value may be based on a linear function, a logarithmic function, or other function utilizing the vehicle speed input signal.

It is a principal object of the present invention to improve vehicle handling and maneuvering efficiency and performance in relation to the current path, a desired path, required route or directed route.

It is a feature of the present invention to incorporate the presentation of a vehicle's position in relation to a moving-map, and enhance this presentation to automatically optimize the operator's awareness of impending geographical features which may influence vehicle maneuvering.

It is an advantage of the present invention that operators of vehicles utilizing a moving-map display system equipped with speed dependent variable range are provided enhanced situational awareness, specifically improved anticipation of upcoming turns and stop points and more precise indications of performance in the maneuvering of the vehicle in relation to its desired route.

Use of the present invention has several advantages over a moving-map display system equipped only with manually selected discrete ranges. A speed dependent variable range allows the vehicle operator to focus on the control of the vehicle rather than the manual selection of an optimal map range. The dynamically varying range feature also provides a finer fidelity to the map range presentation than can be provided by discrete range settings. Each of these advantages should result in reducing the vehicle operator's workload and improving the maneuvering of the vehicle in relation to its desired route.

These and other objects, features, and advantages are disclosed in the specification, figures, and claims of the present application.

DETAILED DESCRIPTION OF THE INVENTION

Figure 1:
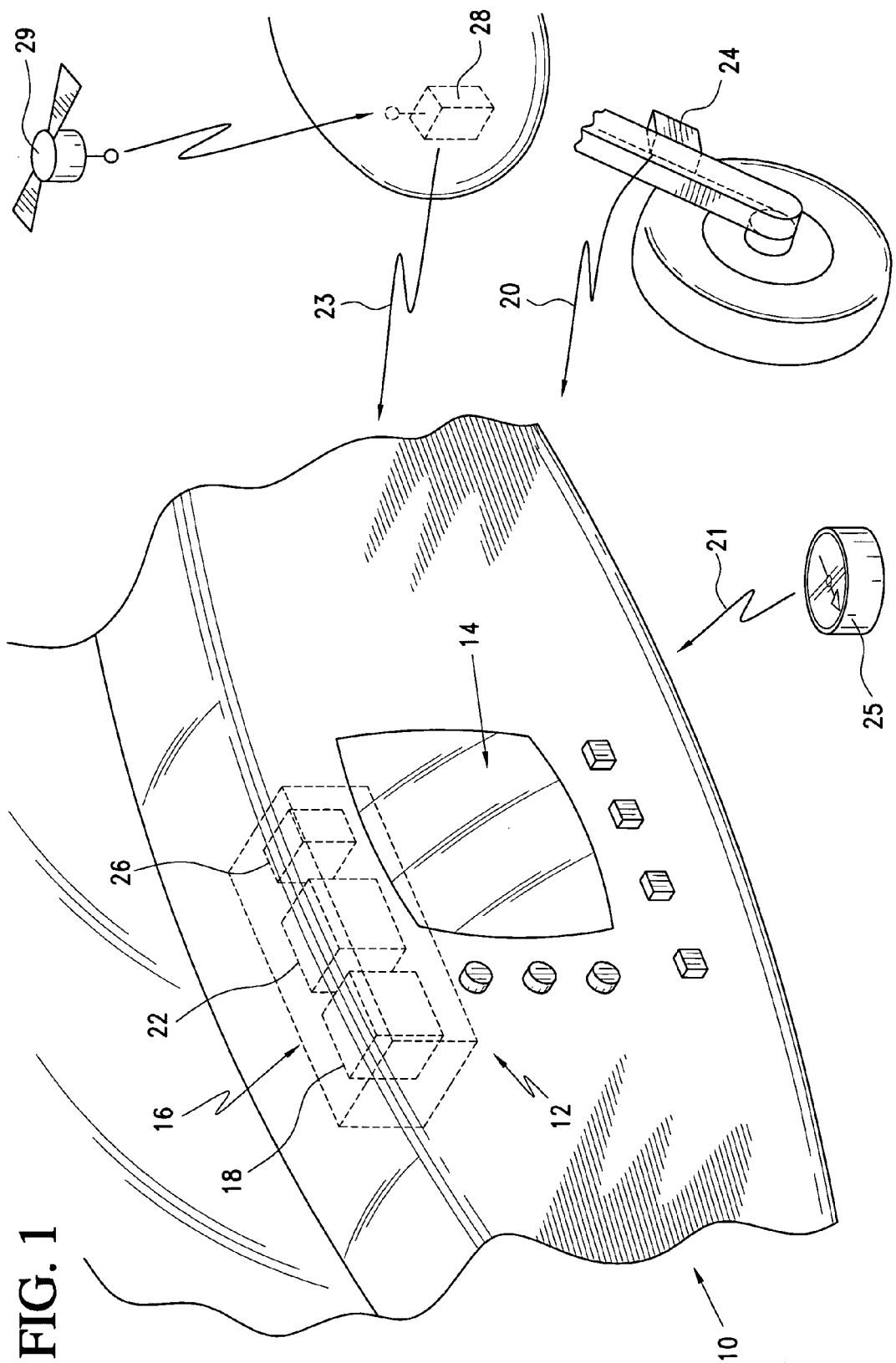
FIG. 1 is a diagrammatic view of a moving-map vehicle display system that incorporates the speed dependent display system of the present invention.

Referring now to the drawings and the characters of reference marked thereon, FIG. 1 illustrates a preferred embodiment of moving-map vehicle display system of the present invention, designated generally as 10. The moving-map vehicle display system 10 includes a computer system, designated generally as 12, which includes a display apparatus, designated generally as 14. The computer system 12 may be, for example, a microprocessor based unit dedicated to providing vehicle situational information, such as the Navigation Display Unit (NDU) developed and produced by the present assignee, Rockwell Collins. This NDU is targeted specifically for aircraft and provides both in-air and on-ground navigational information. The display apparatus 14 may be integrated with the computer system 12 into a single unit, as in the case of the Rockwell Collins NDU, or can be a separate unit provided signals by the computer system. In either case, the display apparatus typically utilizes a Cathode Ray Tube (CRT), Liquid Crystal Display (LCD), or other type of display.

The computer system 12 includes a speed dependent variable display system, designated generally as 16. The speed dependent variable display system 16 includes a data conversion module 18 for converting a vehicle speed input signal 20 to a distance range value. An application module 22 utilizes the distance range value, vehicle position information 23, direction of vehicle movement information 21, and input geographical information 26 to provide scaled output geographical information to the display apparatus 14.

A speed acquisition sensor 24 is operatively associated with the computer system 12 for providing the vehicle speed input signal 20. The sensor 24 may be, for example, a device which determines the rate of tire revolution and converts this to a vehicle speed input signal, or an Inertial Measurement Unit which measures and integrates the vehicle's acceleration to produce a vehicle speed input signal, or a position sensor which determines and differentiates successive vehicle positions to produce a vehicle speed input signal.

A vehicle direction acquisition sensor 25 is also operatively associated with the computer system 12 for providing the direction of vehicle movement input signal 21. The sensor 25 may be, for example, a compass or magnetic flux valve which indicates the vehicle's direction in relation to magnetic north and thereby provide the direction of vehicle movement input signal, or a position sensor which determines and differentiates successive vehicle positions to produce a direction of vehicle movement input signal.

An electronic geographical information database 26 houses the input geographical information to provide to the application module 22. The geographical information database includes real world features to be included in the presentation of a map display. For example, roadways, pathways, buildings and other structures, vegetation, and water features may all be represented within the geographical information database. Characteristics, such as position, size, shape, and orientation, are provided as inputs to the application module 22.

A position determination device 28 is operatively associated with the computer system for providing the vehicle position information 23. The position determination device 28 may be, for example, a satellite positioning receiver system (i.e. utilizing satellite 29) or terrestrial-based positioning receiver system located on-board the vehicle.

Figure 2:
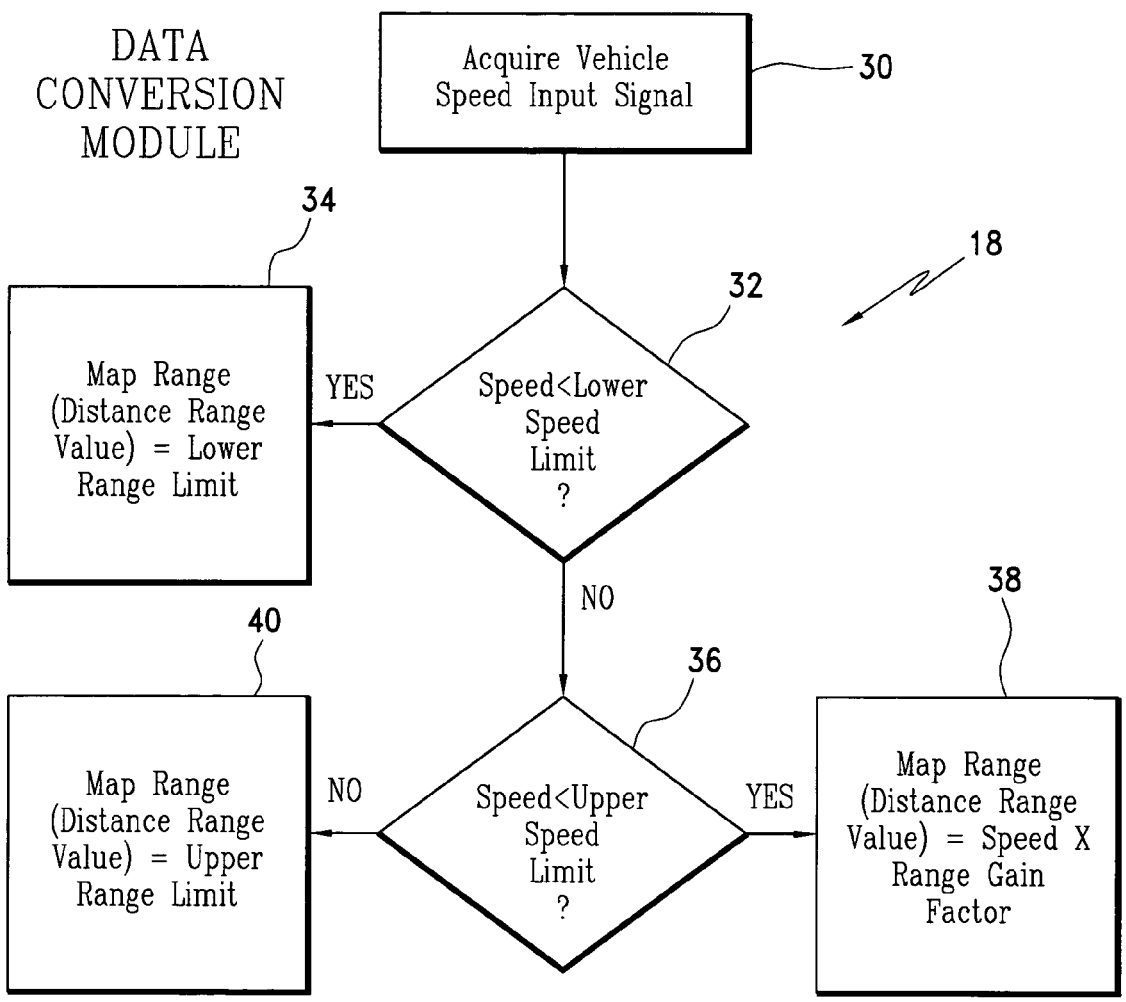
FIG. 2 is a flow chart illustrating a preferred method utilized by the data conversion module for determining the distance range value.

Referring now to FIG. 2 a preferred implementation of the data conversion module 18 is illustrated. The data conversion module 18 acquires the vehicle speed input signal from, for example, the vehicle speed sensor, as denoted in block 30. It first determines if the vehicle speed is less than a lower speed limit (block 32). The distance range value is set equal to a lower range limit if the vehicle speed is less than the lower speed limit (block 34). If not, a determination is made as to whether the vehicle speed is less than an upper speed limit (block 36). If it is, then the distance range value is set equal to Vehicle Speed* Range Gain Factor, where the Range Gain Factor is a predetermined parameter (block 38). The distance range value is set equal to an upper range limit if the vehicle speed is greater than or equal to the upper speed limit (block 40).

The distance range value may vary dynamically, based on an optimized function utilizing the vehicle speed input signal. It may, for example vary linearly or alternatively vary logarithmically.

The data conversion module 18 is a function resident within the computer system 12. Typically, this function appears as software code forming a portion of the computer system's operational software program. The data conversion module 18 may interact directly with and control the interface circuitry within the moving-map vehicle display system 10, which inputs and processes, for example, the vehicle speed input signal 20 received from a speed acquisition sensor 24.

Figure 3:
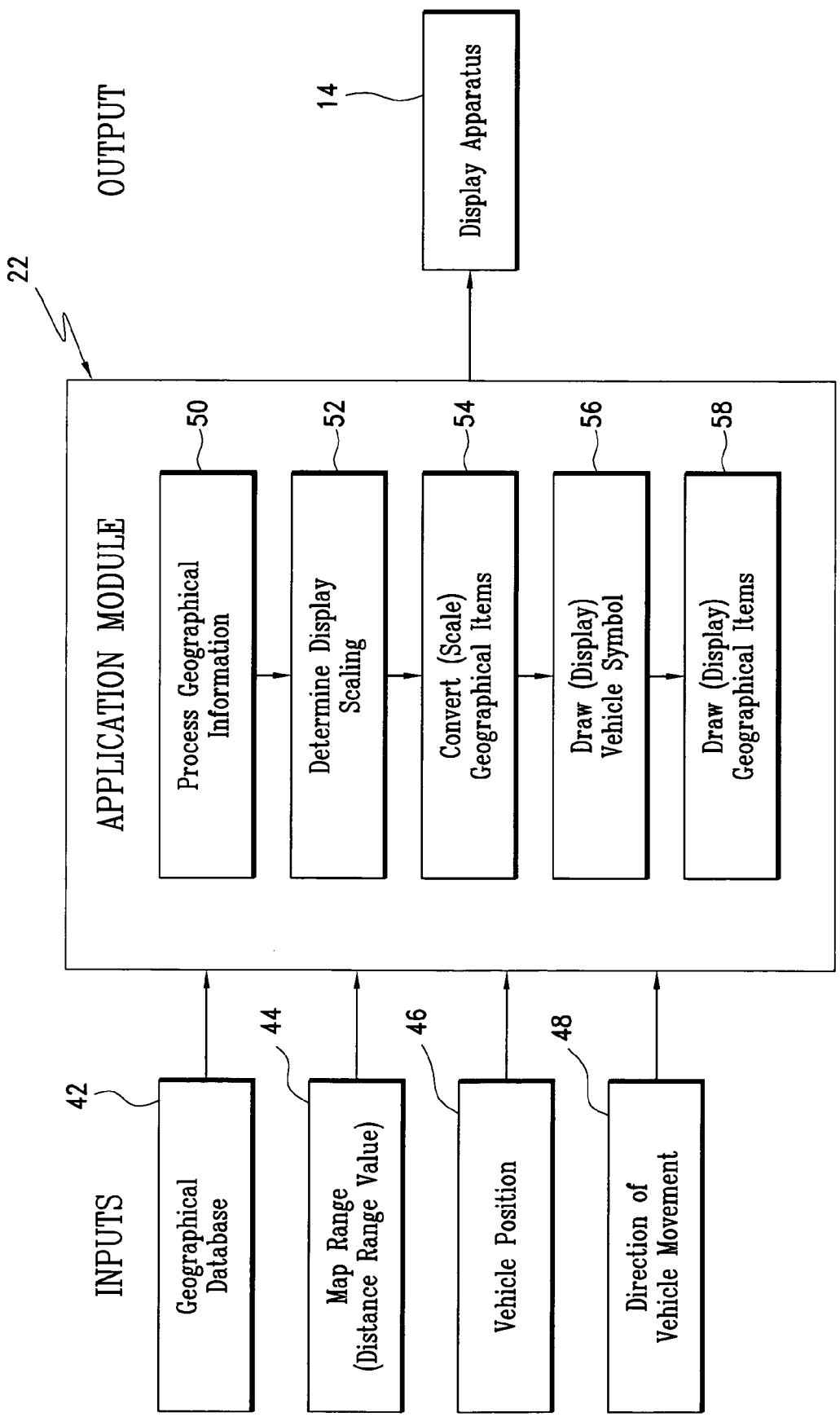
FIG. 3 is a diagrammatic illustration of the application module of the present invention.

Referring now to FIG. 3, a schematic representation of the operation of the application module 22 is illustrated. The inputs to this module 22 include information 42 from the geographical database 42, the map range (distance range value), vehicle position 46 and direction of vehicle movement 48. The application module 22 processes the input geographical information (block 50). The processed input geographical information is utilized to determine a display scaling (block 52). Items to be scaled are converted in accordance with the display scaling (block 54). A vehicle symbol is drawn in accordance with the conversion (block 56). Geographical items are also drawn in accordance with the conversion (block 58). The output from the application module 22 is provided to the display apparatus 14.

The application module 22 is a function resident within the computer system 12. Typically, this function appears as software code forming a portion of the computer system's operational software program. The application module 22 may interact directly with and control the interface circuitry within the moving-map vehicle display system 10, which inputs and processes, for example, a direction of vehicle movement signal 21 received from a vehicle direction acquisition sensor 25. The application module also may interact directly with the geographical database also resident within the moving-map vehicle display system to obtain input geographical information.

Although depicted in FIG. 1 as a vehicle panel mounted display system, the advantages of the present invention are equally applicable to hand-held displays, head-up displays (HUD), or eye-glass and helmet integrated displays. Such technologies represent newer display concepts than traditional panel mounted displays and are often found in certain operating environments that have limited space or require improved see-through visibility.

Figure 4:
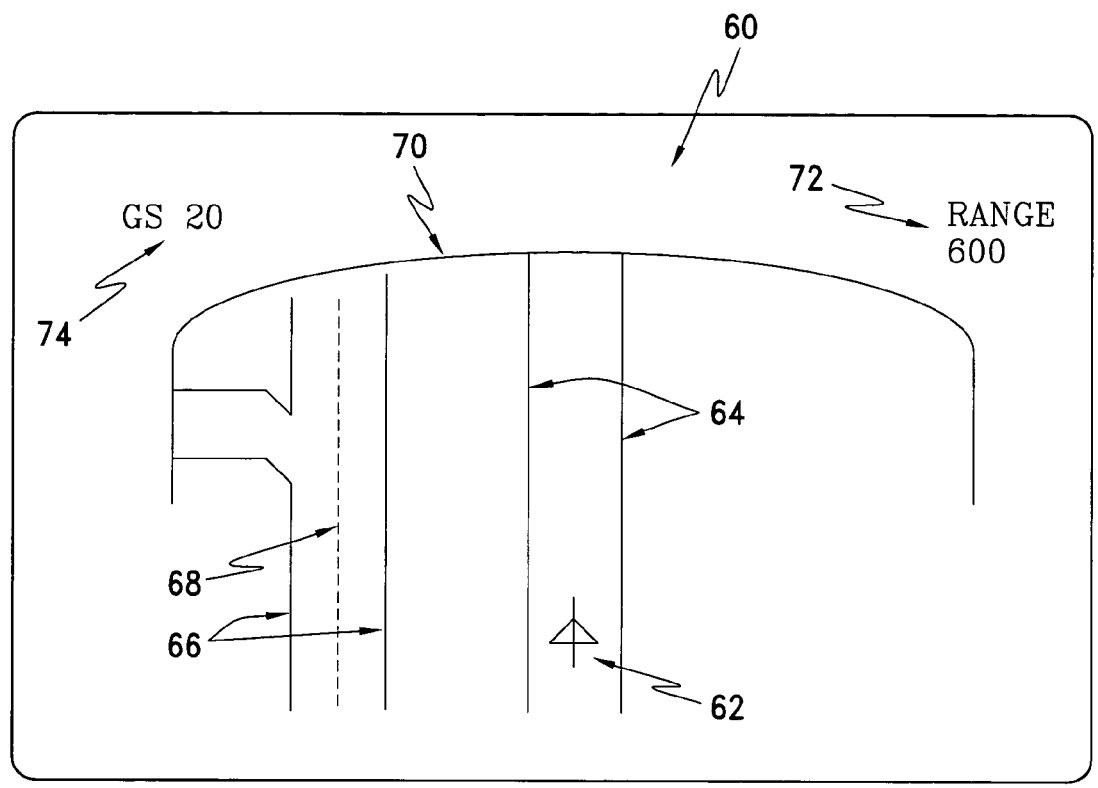
FIG. 4 is a diagrammatic illustration of a display that uses a speed dependent display system of the present invention.

FIG. 4 depicts an example of an instantaneous or "snap-shot" of the display presentation provided to the operator of the vehicle that includes an embodiment of the present invention. As shown, FIG. 4 illustrates a vehicle moving on a roadway as portrayed on the moving-map display 60 viewed by the operator. The display presentation includes a variety of vehicle position and speed information provided in relation to geographical features represented by symbols 62 to 74. This example depicts the vehicle as an aircraft taxiing on an airport's taxiways.

Symbols 62–74 will now be described in detail. Symbol 62 represents an aircraft as viewed from above and remains fixed on the display. The aircraft is shown currently traversing an airport taxiway as depicted by symbol 64, specifically representing the edges of the taxiway. Other taxiways and runways within the distance range of the map presentation are also represented as edge lines, 66, while a runway is additionally distinguished with a dashed centerline, 68. The extent of the map presentation is bordered by an arc 70 along the top and cutoff by vertical lines at either end. The actual distance range that this arc 70 represents is provided by the digital readout 72, above the right edge of the arc, which indicates 600 feet. The aircraft's current ground speed of 20 knots is indicated by a digital readout 74, GS 20, above the left edge of the arc.

Figure 5:
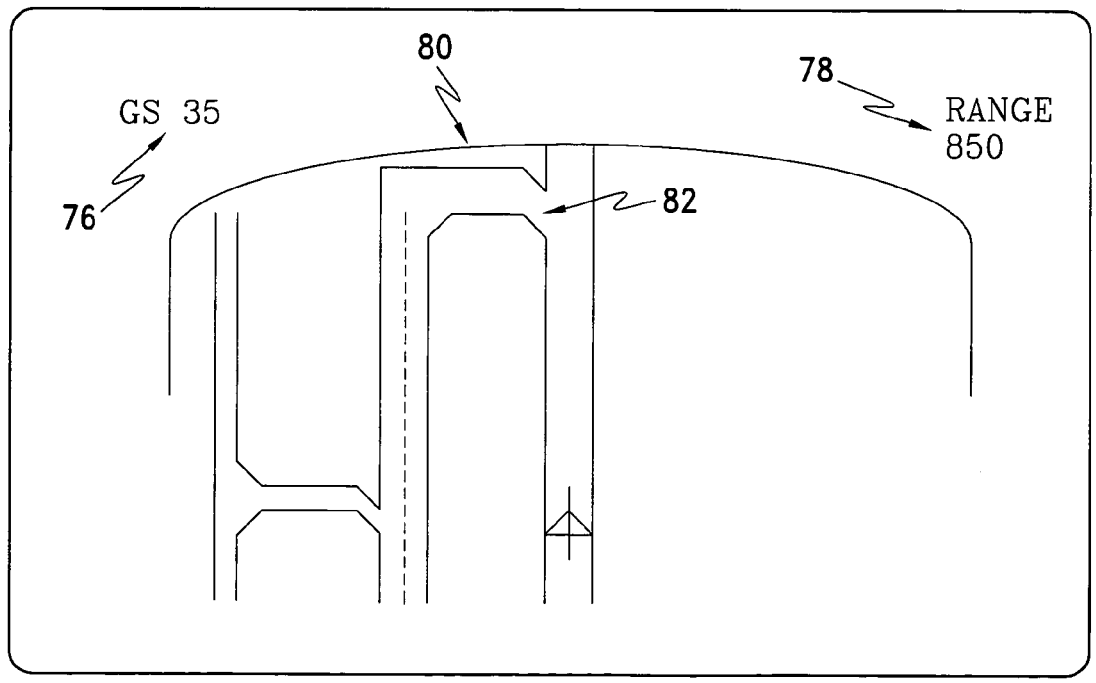
FIG. 5 is a different 'snap-shot' of the example presented in FIG. 4.

FIG. 5 depicts a different snap-shot of the example presented in FIG. 4. In this case, the aircraft's ground speed has been increased to 35 knots as indicated by the digital readout 76, GS 35. Correspondingly, based on the increased aircraft ground speed, the map range has increased (zoomed-out) to 850 feet as indicated by digital readout, 78. The increased map range allows more features of the total airport map to be presented within the designated display area bounded by the arc with the vertical lines at either end, 80. As seen in FIG. 5, the increased map range has resulted in the presentation of a turn off of the taxiway 82, that the aircraft is currently traversing. This demonstrates how additional awareness of an upcoming turn is presented at higher aircraft ground speeds providing the pilot adequate time to recognize the upcoming turn and control the aircraft's speed to a level which results in a comfortable turn rate.

Figure 6:
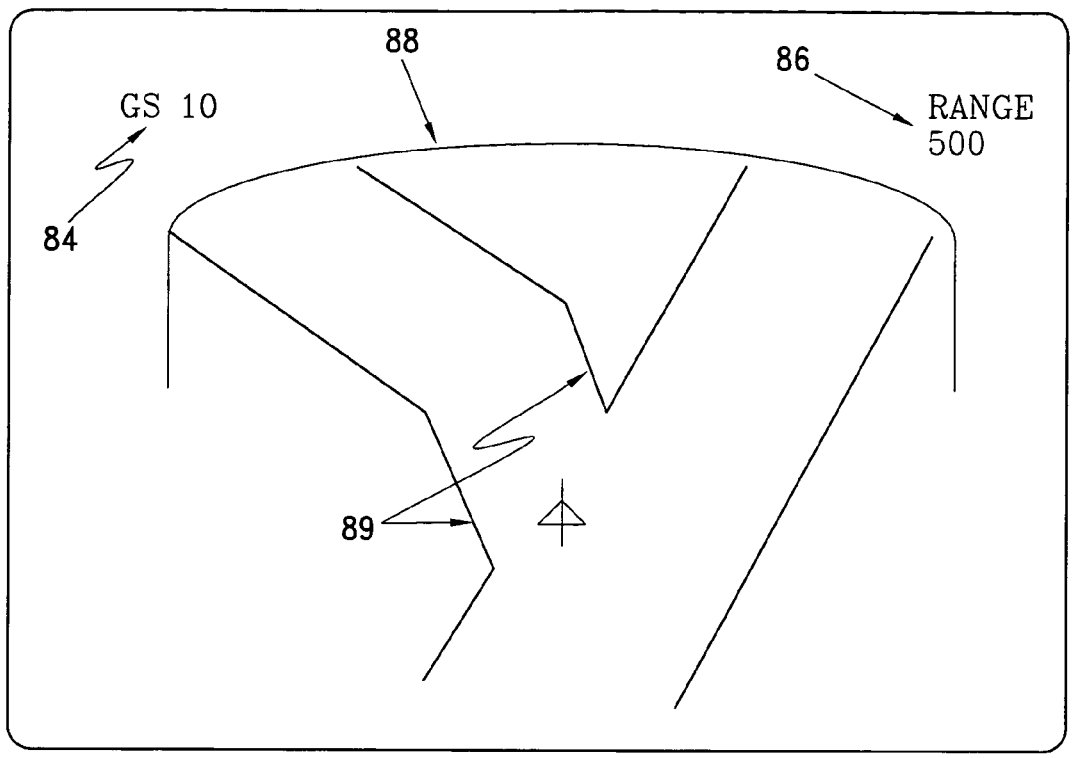
FIG. 6 is a different 'snap-shot' of the example presented in FIG. 5.

FIG. 6 depicts a different snap-shot of the example presented in FIG. 5. In this case, the aircraft has entered the turn with its ground speed reduced to 10 knots as indicated by the digital readout 84, GS 10. Correspondingly, based on the decreased aircraft ground speed, the map range is decreased (zoomed-in) to 500 feet as indicated by digital readout, 86. The decreased map range, in this case, provides a more concise area of the total airport map to be presented within the designated display area bounded by the arc with the vertical lines at either end, 88. As seen in FIG. 6, the decreased map range has resulted in a more precise indication of the aircraft's position in relation to the edges of the turn 89, the aircraft is being maneuvered through. This demonstrates how additional awareness of the constraints, radius, and other features of a turn are presented in response to a slower aircraft ground speed. This feature assumes that the pilot has slowed the aircraft in order to precisely maneuver it through the turn and, therefore, a more precise indication of the aircraft's position in relation to the turn is desirable.

Figure 7:
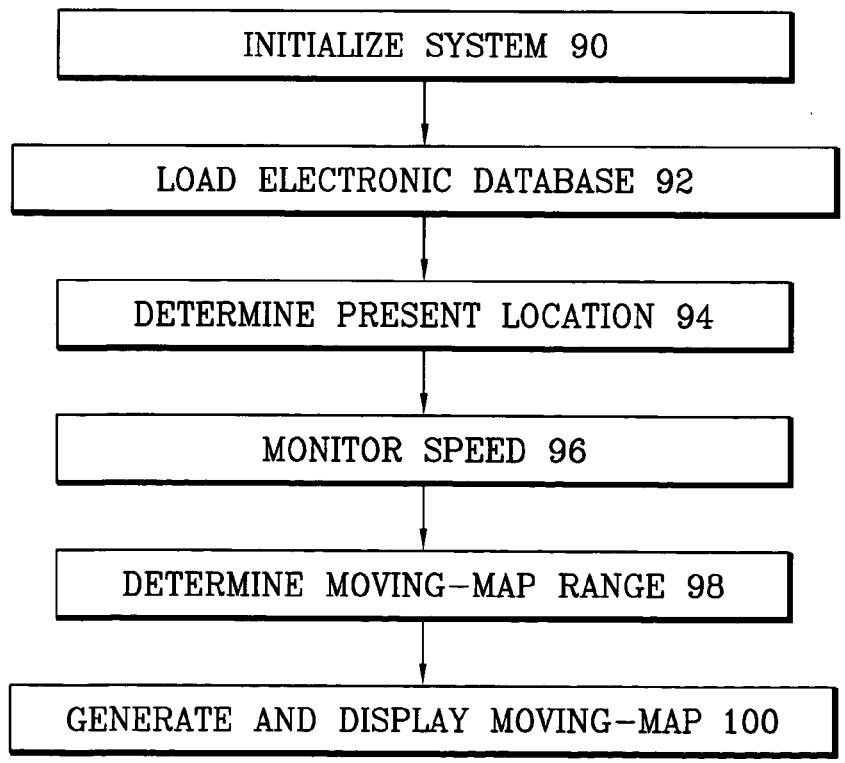
FIG. 7 is a flow diagram of one implementation of the method of controlling the displayed range of a moving-map vehicle display system of the present invention.

FIG. 7 represents a flow diagram of the steps completed by the present invention in normal operation. As a first step 90, the on-board computer system which incorporates a combination of hardware and software which implements the steps of FIG. 7, initializes its relevant operating system. The next step 92 of the disclosed method would be the loading of pertinent application software and electronic data. Pertinent electronic geographical information can be obtained from vendors such as Jeppesen Sanderson, Inc.

Once the system is operating and has accessed the relevant geographical database, the present vehicle location must be determined, step 94. This step can be accomplished manually, or automatically, via a satellite-based system, such as GPS or a terrestrial based geo-positioning system.

In order to determine the range of scaled geographical information to be presented on the moving-map display, an input signal that provides current vehicle speed must be provided to the moving-map display system and monitored, step 96. The current vehicle speed is used in the determination of the moving-map range, step 98, utilizing the following algorithm which was also discussed above with respect to FIG. 2:

IF (Vehicle Speed<Lower Speed Limit)

THEN Map Range (distance range value)=Lower Range Limit;

ELSE IF (Vehicle Speed<Upper Speed Limit)

THEN Map Range (distance range value)=Vehicle Speed*Range Gain Factor;

ELSE Map Range (distance range value)=Upper Range Limit.

The Range Gain Factor parameter can be based on a linear progression between the Lower Range Limit and the Upper Range Limit, or other type of function (e.g., logarithmic function).

Finally, the scaled geographical information within the determined moving-map range is presented on the moving-map display apparatus, step 100. This presentation is based on the information contained within the geographical database relative to the position and orientation of the vehicle as depicted in the following application steps:

1) Process Geographical Information—Separate those specific items within the geographical database which are within the determined Map Range (distance range value) of the current vehicle position, from those which are outside of the Map Range (distance range value). Only these items will appear on the Moving-Map Display.

2) Determine Display Scaling—In order to present the separated geographical items on the display, the size of each geographical item needs to be converted from an earth-frame representation (feet) to a display coordinate representation (display units). This conversion factor is determined by dividing the total display area designated as the moving-map display region (represented in display units) by the calculated Map Range (distance range value represented in feet). The resulting value can be used to convert an item represented in feet to that same item represented in display units.

3) Convert (Scaled) Geographical Items—The size and position characteristics of each specific item selected from the geographical database through the processing identified in step 1 above, are then converted (scaled) to comparable characteristics represented in display units, by applying the display conversion factor determined in step 2.

4) Draw (Display) Vehicle Symbol—In order to position and orient the converted (scaled) geographical items within the moving-map display region, a reference point representing the position of the vehicle needs to be assigned to a fixed position within that moving-map display region. A vehicle symbol is drawn (displayed) at this fixed reference position at a fixed orientation (pointing directly upward) in relation to the display region.

5) Draw (Display) Geographical Items—Each geographical item, as represented in display units, can next be drawn within the moving-map display region. Also, the direction that the vehicle is moving dictates the orientation of the geographical item in relation to the fixed vehicle symbol drawn in step 4.

Other embodiments and configurations may be devised without departing from the spirit of the invention and the scope of the appended claims.

The invention claimed is:

1. A speed dependent variable moving-map vehicle display system, comprising;
    a data conversion module for converting a vehicle speed input signal to a distance range value;
    an application module for utilizing vehicle position information, input geographical information, direction of vehicle movement information, and said distance range value to provide scaled output geographical information; and
    a moving-map display for displaying the scaled output geographical information, vehicle position information, and direction of vehicle movement information and wherein a range of the moving-map display varies dynamically dependent on the distance range value.

2. The speed dependent variable moving-map vehicle display system of claim 1 further comprising a geographical information database for providing the input geographical information.

3. The speed dependent variable moving-map vehicle display system of claim 1 further comprising a vehicle direction acquisition sensor for providing the direction of vehicle movement information.

4. The speed dependent variable moving-map vehicle display system of claim 1 further comprising a speed acquisition sensor for providing the vehicle speed input signal.

5. The speed dependent variable moving-map vehicle display system of claim 1 wherein said data conversion module converts said vehicle speed input signal to 1) a moving-map display range having a lower range limit if the vehicle speed is less than a lower speed limit; 2) a moving-map display range having an upper range limit if the vehicle speed is greater than an upper speed limit; and, 3) a moving-map display range having a calculated range limit if the vehicle speed is between the lower speed limit and the upper speed limit.

6. The speed dependent variable moving-map vehicle display system of claim 5 wherein said calculated range limit is determined by multiplying the vehicle speed by a range gain factor.

7. The speed dependent variable moving-map vehicle display system of claim 5 wherein said calculated range limit is based on one of a linear function and a logarithmic function.

8. The speed dependent variable moving-map vehicle display system of claim 1 wherein said data conversion module comprises means for implementing the steps of:
    determining if the vehicle speed input signal is less than a lower speed limit;
    setting said distance range value equal to a lower range limit if the vehicle speed input signal is less than the lower speed limit;
    determining if the vehicle speed input signal is less than an upper speed limit if the vehicle speed input signal is greater than or equal to the lower speed limit;
    setting said distance range value equal to Vehicle Speed*Range Gain Factor, where the Range Gain Factor is a predetermined parameter, if the vehicle speed input signal is less than said upper speed limit; and,
    setting said distance range value equal to an upper range limit if the vehicle speed input signal is greater than or equal to the upper speed limit.

9. The speed dependent variable moving-map vehicle display system of claim 1 wherein said application module, comprises means for implementing the steps of:
    processing said input geographical information to select which items are to be displayed;
    utilizing the distance range value determined by the data conversion module to assign a display scaling;
    converting the selected items to be scaled in accordance with said display scaling;
    drawing a vehicle symbol in accordance with said conversion; and
    drawing geographical items in accordance with said conversion.

10. The speed dependent variable moving-map vehicle display system of claim 9 wherein said step of processing said input geographical information comprises separating items within the geographical database that are within a determined distance range value of the current vehicle position, from those that are outside of the distance range value.

11. The speed dependent variable moving-map vehicle display system of claim 1 wherein said scaled output geographical information is presented on the moving-map display positioned relative to a fixed symbol representing the vehicle's position.

12. A moving-map vehicle display system, comprising:
   a data conversion module for converting a vehicle speed input signal to a distance range value;
   an application module for utilizing vehicle position information, geographical information, and said distance range value to provide scaled output geographical information;
   an electronic geographical information database for receiving and storing said input geographical information to provide to said application module; and
   a moving-map vehicle display apparatus for receiving and displaying said scaled output geographical information wherein a display range of the moving-map vehicle display apparatus varies dynamically with the distance range value.

13. The moving-map vehicle display system of claim 12 further including a position determination device for providing said vehicle position information.

14. The moving-map vehicle display system of claim 13 wherein said position determination device comprises a satellite positioning receiver system.

15. The moving-map vehicle display system of claim 13 wherein said position determination device comprises a terrestrial-based positioning system.

16. The moving-map vehicle display system of claim 12 further including a speed acquisition sensor for providing said vehicle input signal.

17. A method for providing a moving-map vehicle display system, comprising the steps of:
   loading an electronic geographical information database of said moving-map vehicle display system;
   determining a present vehicle position;
   monitoring a vehicle speed;
   generating a moving-map display based on the present vehicle position and having a range based on the monitored vehicle speed; and
   dynamically varying the range of the moving-map display in accordance with variations in the monitored vehicle speed.

18. The method of claim 17, wherein said step of varying the range of the moving-map display, comprises setting the map range to 1) a lower range limit if the monitored vehicle speed is less than a lower speed limit; 2) and upper range limit if the monitored vehicle speed is greater than an upper speed limit; and, 3) a calculated range limit if the monitored vehicle speed is between the lower speed limit and the upper speed limit.

19. The method of claim 18, wherein said calculated range limit is determined by the step of multiplying the monitored vehicle speed by a range gain factor.

20. The method of claim 19, wherein said range gain factor is based on a linear progression between the lower range limit and the upper range limit.

* * * * *